3,070,165
FRACTURING FORMATIONS IN WELLS
Charles A. Stratton, Caney, Kans., assignor to Phillips Petroleum Company, a corporation of Delaware
No Drawing. Filed Dec. 14, 1959, Ser. No. 859,158
13 Claims. (Cl. 166—42)

This invention relates to the treatment of underground formations or strata penetrated by an oil or gas well, or other deep well, to increase the productivity of fluids therefrom. In another aspect it relates to a method of completing an oil or gas well. In another aspect it relates to fracturing formations in wells. In a further aspect, it relates to a method and composition for hydraulically fracturing underground formations of relatively low permeability penetrated by an oil or gas well. In another aspect, it relates to the treatment of liquids used in well working operations. In a further aspect it relates to an improved fracturing liquid having desirable low fluid-loss characteristics.

In recent years, various methods have been proposed in the oil industry for increasing or stimulating the productivity of oil or gas wells by enlarging the flow or drainage pattern within a selected oil- or gas-producing formation of relatively low permeability. Emphasis has been placed on hydraulically fracturing such formations with various liquids, such as native crude oil, lease crude oil, diesel fuel, kerosene, etc., with or without propping agents, such as sand, suspended therein. These liquids are pumped in a well adjacent the formation to be fractured and sufficient pressure applied to the body of liquid in the well. The hydraulic pressure applied to such low permeable formations creates tensile stresses in the rock of the formation surrounding the well bore and these stresses cause splitting, parting, or fracturing of the rock, the pressure required to part or fracture a formation in a well being termed "formation breakdown pressure." The initially formed fractures or channels are then extended by the injection of hydraulic liquid therein, the propping agent being deposited in the fractures to maintain the permeability of the formation during subsequent production thereof.

While a great number of wells have been successfully fractured with hydraulic fracturing liquids, the applicability of such fracturing methods is often limited by the nature of the fracturing liquid. For example, some of these fracturing fluids require injection of gel breaker solutions into the formation to reduce the viscosity after fracturing has been completed. The viscosity, fluid-loss characteristics, and injection rate of the fracturing liquid are variables which determine the fracture area developed. The fluid-loss characteristics of the fracturing liquid are generally considered the most significant of these variables. It is essential that the fracturing liquid remain in the fractures created if these fractures are to be extended and the propping agent placed therein. If the fracturing liquid is lost to the fractured formation, it cannot aid in the extension of fractures and further increases in the ratio of propping agent to fracturing liquid in the fracture give rise to sand-outs.

A number of additives have been developed recently for controlling the fluid-loss of fracturing liquids. A widely used, commercially available additive of this type is Adomite (trademark), which has been described as a mixture of an oil-soluble dispersing agent, an "agglutinant" and oil-insoluble solids. Other commercially available fracturing liquid additives are FL–2 and FL–3. Many of the fluid-loss additives which have been proposed, patented, or used have one or more properties which restrict their application.

Accordingly, an object of this invention is to improve the treatment of underground formations or strata penetrated by an oil or gas well, or other deep well, to increase the productivity of fluids therefrom. Another object is to complete a well. Another object is to fracture formations in wells. Another object is to provide an improved method for hydraulically fracturing underground formations or strata of relatively low permeability. Another object is to treat liquids used in well working operations. Another object is to provide an improved fracturing liquid composition having desirably low fluid-loss characteristics and other desirable properties. Other objects and advantages of this invention will become apparent to those skilled in the art from the following discussion and appended claims.

Broadly, the present invention provides an improved well working composition comprising a liquid carrier, such as a petroleum hydrocarbon liquid, and sulfonated asphalt dispersed therein. The sulfonated asphalt can be prepared by sulfonating asphalt with a sulfonating agent, such as liquid sulfur trioxide, neutralizing the resulting sulfonic acids with a basic material, such as sodium hydroxide, and recovering the resulting asphaltic sulfonic acid salt. The sulfonated asphalt additive has the ability to lower the fluid-loss characteristics of the carrier, retarding its tendency to filter into the permeable formations treated.

The terms "asphalt" or "asphaltic material" as used in this specification and in the appended claims are meant to cover dark brown to black liquid, semi-solid or solid cementitious mixtures of hydrocarbons of natural or pyrogenous origin, or combinations of both, or fractions or components thereof, which are completely or substantially soluble in carbon disulfide, and wherein bitumens are the sole or predominant constituent. Naturally occurring or native asphalts which can be used in preparing the sulfonated asphalt fluid-loss control additives of this invention representatively include albertite, elaterite, gilsonite, grahamite, wurtzilite, Trinidad and Bermudez Lake asphalts, and the like. Pyrogenous asphalts which can be used in preparing the additive of this invention include those obtained by refining petroleum by distillation, precipitation, cracking, oxidation, or similar operations, for example, distillation residues, still bottoms, cracked residues, straight-run residues, blown asphalt, etc. Fractions or components of asphaltic materials useful in preparing the sulfonates used in this invention representatively include asphaltenes, maltenes, carbenes, oily constituents, asphaltic resins, asphaltic acids and their anhydrides, and the like.

The terms "sulfonate," "sulfonated asphalt" and "sulfonated asphaltic material" as used in this specification and in the appended claims are meant to cover the neutralized salts of asphalt that have been sulfonated with a sulfonation agent, such as liquid sulfur trioxide.

Asphalts having ring and ball softening points in the range of 115° F. to 260° F. are generally applicable in preparing the sulfonate, those having softening points in the range of 160° F. to 190° F. being even more preferred.

Especially useful asphaltic starting materials which can be used in the practice of this invention are the visbroken, vacuum reduced asphalts having ring and ball softening points in the range of about 135° F. to 250° F., which can be prepared, for example, by subjecting topped crude oil to alternate stages of vacuum reduction and visbreaking. Typical asphaltic starting materials of this type will comprise 21 to 38 percent asphaltenes, 25 to 34 percent asphaltic resins, and 36 to 49 percent oily constituents, with ring and ball softening points in the range from 136° F. to 180° F. A specific example of a visbroken, vacuum reduced asphalt has 21.80 percent asphaltenes, 31.10 percent asphaltic resins, and 47.13 percent oil constituents, with a ring and ball softening point of 136° F.

In preparing the sulfonates of this invention, the asphaltic starting material can have a liquid, semi-solid or solid constituency and is preferably in a granulated, pulverized, or finely-divided form. The asphaltic material can be preliminarily dispersed in a suitable inert or nonsulfonatable, nonaromatic, diluent such as carbon tetrachloride, chloroform, gasoline, kerosene, cyclohexane, diesel fuel, and the like. A particularly useful diluent in many cases will be liquid sulfur dioxide. I prefer to use as diluents normally liquid, inert, low-boiling paraffinic hydrocarbons, particularly those having a total of 5 to 8 carbon atoms per molecule, such as pentane, hexane, heptane, and octane. The diluent can be added serially to the asphaltic material before sulfonation and further amounts may be added after sulfonation. The diluent can be separated from the sulfonation mixture by distillation, simple warming or heating, or extraction with suitable non-polar solvents. In some cases, the diluent need not be separated from the sulfonation mixture. Asphaltdiluent dispersions of about 15 to 50 weight percent, preferably 20 to 35 weight percent, will generally be used.

Sulfonation temperatures will generally be controlled within the range between about 0° F. and 250° F. with the preferred operating range being between about 45° F. and 140° F., and the most useful being between about 75° F. and 125° F. The asphalt-sulfonating agent weight ratio will vary with the sulfonation temperature, the sulfonating agent, and asphalt starting material, but generally will be in the range from about 1:0.1 and 1:1. The sulfonation reaction is usually carried out at atmospheric pressure although pressure greater or less than atmospheric can be employed if desired.

Sulfonating agents which can be utilized in the sulfonation step include concentrated sulfuric acid, fuming sulfuric acid, chlorosulfonic acid, and sulfur trioxide. The fuming sulfuric acid can vary from about 10 to 40 weight percent excess $SO_3$; commercial fuming sulfuric acid having about 20 weight percent excess $SO_3$ can be used, this type of fuming sulfuric acid being known as oleum. I prefer to use liquid sulfur trioxides as the sulfonating agent, particularly the gamma-form, in the amount of 10 to 100 pounds per 100 pounds of asphaltic charging stock.

The sulfonating agent is preferably added drop-wise or in increments to the dispersion of asphaltic material with stirring and agitation. The sulfonation reaction can be stopped by the addition of water to the reaction mixture, although I prefer to control sulfonation by avoiding an excess of sulfonating agent and adding it in controlled amounts.

After sulfonation, the diluent can be separated from the reaction mixture, if desired, by distillation, vacuum flashing, or the like. Prior to the neutralization of the resulting sulfonic acid, sulfur dioxide can be removed from the reaction mixture in any convenient manner, for example, by simple warming or stripping with air. The sulfonation reaction mixture can be directly neutralized or can first be preliminarily separated by filtration or the like into a sulfonic acid phase and a sludge phase containing unreactive starting material.

The sulfonic acids are neutralized by contacting them with a basic neutralizing agent, such as anhydrous or aqueous ammonia, or an aqueous solution or slurry of an alkali metal or alkaline earth metal salt, oxide, or hydroxide, thereby converting the sulfonic acids to the corresponding ammonium or metal sulfonates. Metals which are particularly suitable for preparing the sulfonates of this invention include alkali metals such as sodium and potassium, and alkaline earth metals such as magnesium, calcium, barium, and the like. The preferred sulfonates of this invention are the ammonium and sodium asphalt sulfonates. It is also within the scope of this invention to use a combination of neutralizing agents; for example, the sulfonic acids can be first neutralized with anhydrous ammonia and then with sodium hydroxide, or first with sodium hydroxide and then with anhydrous ammonia.

After the neutralization step, the neutralized mixture can then be allowed to settle and then separated, for example, by decantation, centrifugation, filtration, or the like, to separate the sulfonates from sludge or other unreactive material. I prefer to subject the neutralized mixture to vacuum flashing to remove the diluent and other volatile material. In some cases, depending on the particular starting material and sulfonating agent utilized, the sulfonation and neutralization can be carried out under substantially dry or anhydrous conditions. The resulting sulfonate product can be dried or diluted with a hydrocarbon oil or water.

The resulting asphalt sulfonate used in preparing the fracturing liquids of this invention has a chemical nature which is very difficult to accurately ascertain due to the complexity of the asphaltic starting material, although generally it will have a sulfur content in the range between about 3 and 30 percent. The source of the starting material is one of the several variables which determine the predominate organic nature of the sulfonates, i.e., paraffinic, naphthenic, or aromatic.

The sulfonated asphalt products of this invention have a wide range of dispersibility in water and oil, the particular degree of dispersibility being dependent on the nature of the asphaltic starting material, the degrees of sulfonation and neutralization, etc. Generally, these sulfonated asphalt products have portions which are soluble in water, portions which are soluble in oil, and portions which are insoluble in both. A typical product of this invention, the sodium salt of asphaltic sulfonic acids, was found to be 30.4 weight percent soluble in kerosene and 69.6 weight percent insoluble in kerosene; 7.2 weight percent of this prduct was solids insoluble in kerosene and having a particle size below 2 microns, with the balance of the kerosene-insoluble solids having a particle size greater than 2 microns. The oil-insoluble portion of this product did not form a gelatinous precipitate when dispersed in kerosene to which a small amount (33 weight percent) of water was added.

The sulfonated asphalt fracturing liquid additives of this invention are mixed with any suitable carrier or vehicle, such as a petroleum hydrocarbon liquid, water, or other liquid normally used in fracturing. Useful petroleum hydrocarbon liquids which can be used as the carrier or vehicle of the hydraulic fracturing liquids of this invention representatively include lease crude oils, gas oil, diesel fuel, kerosene, gasoline, heavy fuel of the Bunker C type, naptha, refined oils, semi-refined or residual oils, refinery cuts or blends, and various other hydrocarbon liquids. It is also within the scope of this invention to use, as the carrier or vehicle, fresh water, salt water, oil field brine, dilute acid solutions such as 3 to 15 percent hydrochloric acid, and the like, although the aforementioned petroleum hydrocarbon liquids are preferred.

Although it is not necessary to add any dispersing agent or surfactants to the mixture of the carrier and sulfonated asphalt, in order to obtain a stable dispersion or mixture, these other chemicals can be added, if desired. Further, anti-foam agents can be added, although they are not necessary since very little, if any, foam will occur when the fracturing fluid is prepared. Propping agents which can be used in the fracturing liquids of this invention can be any of those well known in the art, and generally will be finely divided sand or gravel. An especially useful propping agent is Ottawa sand. Where sand is used, this material can be from about 10 to 80 mesh, preferably 20 to 60 U.S. standard sieve. The amount of sand used will depend upon various considerations, such as the size of the fracturing treatment, the depth of the formation, the particular hydraulic liquid, etc., and normally will vary between 0.5 to 6 pounds per gallon of hydraulic fracturing liquid. As extension of the fractures progresses, the propping agent content of the fracturing liquid can be progressively increased.

The amount of sulfonated asphalt added to the hydraulic fracturing liquid will vary, and be dependent upon several variables, such as the nature of the sulfonate itself, the density of the fracturing fluid desired, the nature of the formation penetrated, the type of carrier or vehicle used, and other factors that can be readily determined by those skilled in the art by means of simple, well-known routine tests. Generally, the amount of sulfonate employed, stated functionally, will be that amount sufficient to reduce the fluid-loss of the fracturing liquid, without rendering the fracturing liquid too viscous to be pumped or circulated. Stated another way, the amount of additive used is that sufficient to retard the tendency of the fracturing liquid to filter into the permeable formation treated. For most applications, the amount of sulfonated asphalt added to the fracturing liquids of this invention will be in the range of about 0.1 to about 10 pounds per barrel (42 U.S. gallons) of fracturing liquid, although amounts lesser or greater (e.g., up to 30 pounds per barrel) than this range can be employed.

The fracturing liquids of this invention can be prepared by using any of the conventional proportioning and mixing techniques now used in the art. For example, the sulfonated asphalt can be added to the carrier as a dry material through a proportioner hopper, or as a concentrate in the form of a concentrated dispersion of the sulfonated asphalt in a small amount of the carrier, or by means of chemical metering pumps, etc.

Any of these underground formations or strata known to be fracturable can be fractured using the novel fracturing liquid of the subject invention, such as consolidated sandstones, limestones, dolomites, granite washes, hard or brittle shale, conglomerates, and the like, such formations generally having a permeability in the range of 0.1 to 200 millidarcies. Formations having existing fractures, or initial fractures created by previous fracturing operations, can be extended and the productivity of the formation increased by using the fracturing fluid of this invention to extend such fractures.

The well treated with the fracturing liquids of this invention can be provided with the usual wellhead pressure connections and fittings, such as blow-out preventors, pressure gauges, etc. The hydraulic fracturing liquid of this invention can be pumped directly down the well casing or down through tubing depending within the casing. The particular formation to be fractured can be isolated by means of suitable packers or the like. The usual pump trucks can be used to pump the hydraulic fracturing liquid down through either the casing or tubing, or both. Prior to the actual fracturing operation, the well bore can be cleaned with any suitable cleaning liquid such as dilute acid, lease crude, any of the carriers used to prepare the fracturing liquid, or the fracturing liquid itself.

The initial fractures can be produced with lease crude, or any other suitable liquid such as those employed as carriers in the fracturing liquids of this invention, or even the fracturing liquid of the subject invention; these liquids can be generically termed "formation breakdown fluids." After fractures have been initiated, the fracturing liquid of this invention, preferably loaded with the propping agent, is then pumped into the initially-formed fractures under high pressure to extend the same. Where fracturing is to take place through a casing, the casing can be perforated by conventional means, such as with a perforating gun lowered into the well by means of a wire line to provide one or more perforations adjacent the formation to be fractured. Where the fracturing operation is carried out in open-hole, perforating operations are generally not necessary. The formation breakdown pressure will generally be less than or equal to the overburden pressure, therefore most formations will be fractured with pressures from about 0.6 to 1.0 p.s.i. per foot of depth of the selected portion of the formation, e.g., from 500 to 3500 p.s.i. When the formation breakdown pressure is reached, the formation of initial fractures will be indicated by a pressure drop at the surface. The hydraulic fracturing liquid of this invention can then be pumped into the well and into the initially-formed fractures, the suspended sand being deposited in the extended fractures. The low-penetrating fracturing liquid of this invention will have a retarded tendency to filter into the permeable surfaces or walls of the growing fractures and be lost thereto. Because of the low fluid-loss of these fracturing liquids, it is not necessary to use large pumps and increase the rate of injection in order to inject the liquid faster than it filters into the formation, and because of this low fluid-loss much less fracturing liquid will be required to fracture a formation. At the end of the fracture treatment, pressure is released and the fracturing liquid allowed to continually leak off into the formation until the walls of the fractures close down upon the deposited propping material which holds the fractures fully or partially open, thereby maintaining the increased permeability of the formation. The fracturing fluid can then be removed from the wall by producing the same. As a result of the fracture treatment, the flow or drainage pattern of the formation is enlarged and the productivity of the well is increased. The extension length or width of the fractures will depend upon the volume of fracturing fluid injected, the volume of fracturing fluid retained in the fractures, and the geometry of the fracture. Such fractures will be oriented in horizontal planes, vertical planes or slightly inclined planes, depending upon the viscosity of the fracturing fluid and the formation stresses and tensile strength of the formation. The formation can be successively fractured by additional fracture treatments in the same or different selected portions of the well.

The sulfonated asphalt additive of the subject invention has several properties which makes its use extremely attractive in the preparation of fracturing fluids. The additive will generally impart lower fluid-losses to the fracturing fluid with amounts of additive smaller than those of other conventional additives. The additive itself does not pick up excessive moisture from the air or become tacky and it will not cause any substantial foaming during the preparation or use of the fracturing fluid. My fracturing fluid, using a petroleum oil as the carrier, is not affected adversely by the presence of water, in fact, in some cases small amounts of water actually tend to lower the fluid-loss of the fracturing liquid; for example, where a fracturing liquid of this invention comprising 2 pounds of sulfonated asphalt per barrel of crude oil was treated with increasing amounts of water, the fluid-loss of the fracturing liquid continued to decrease until 15 weight percent of water was added, and up to 20 weight percent water did not materially increase the fluid-loss. Elevated temperatures and pressures have a minimum effect on the fracturing liquids of this invention. The sulfonated asphalt additive can be used with a wider variety of carriers or vehicles, particularly lease crude oils, than other conventional additives; in fact, the additive of this invention can be used with the more viscous crude oils. Further, the fluid-loss of the fracturing liquids of this invention decreases with increasing concentration of the additive, thus increasing the applicability of the additive. Fracturing liquids containing the additive of the subject invention also will not damage the formations treated or contacted. The additive itself can be prepared from waste refinery material, thereby making it very economical to prepare and use.

The following example is set forth to further illustrate the objects and advantages of this invention; however, it should be understood that the various ingredients, amounts of ingredients, and other conditions, should not be construed so as to unduly limit this invention.

The fluid-loss characteristics of fracturing liquids prepared according to the subject invention were evaluated. For purposes of comparison, other fracturing liquids containing other commercially available fluid-loss control additives were also prepared and evaluated.

A sulfonated asphalt typical of that employed as an additive in this example was prepared as follows. Asphalt charge stock, a vis-broken, vacuum reduced asphalt having a ring and ball softening point of 168° F., was dispersed in hexane to provide a hexane blend having an API gravity of 56.8 and containing 26.2 weight percent of asphalt, or 1.68 pounds of asphalt per gallon. Eight-five gallons of the hexane blend were sulfonated with 90 pounds of liquid $SO_3$, the average reaction temperature being 85° F. The sulfonation mixture was then neutralized with 71 pounds of aqueous caustic (NaOH), the maximum temperature during neutralization being 123° F. Following neutralization, the mixture was then vacuumed flashed to remove hexane and yield 267 pounds of the sodium salt of sulfonated asphalt.

Fracturing fluids of this invention were prepared by dispersing different amounts of sulfonated asphalt in different intermediate base South Oklahoma crude oils. The fluid-loss properties of these crude oils and the fracturing fluids were determined according to the standard procedure and equipment as outlined in API RP 29 "Recommended Practice Standard Field Procedures for Testing Drilling Fluids," Fourth Edition, May 8, 1957. The fluid losses of these fracturing fluids at high temperature and high pressure were also determined, this procedure being a modification of said API RP 29. In this modification, the jacket of a Baroid No. 387 filter press was heated to a temperature (130° F.) which would maintain the fluid inside the cell at 125° F. The cell containing the sample to be tested was placed in the jacket. When the cell reached 125° F., 1000 pounds per square inch pressure was applied to the fluid in the cell, and the bottom valve was opened for 30 minutes. After 30 minutes, the bottom valve was closed and the volume of filtrate was noted and recorded. This value was doubled and recorded as the high temperature and high pressure fluid loss ("387" in Table II).

For comparison purposes, the fluid losses of fracturing fluids containing three commercially available fluid-loss control additives, namely FL-2, FL-3, and Adomite, were also evaluated.

Table I sets forth the properties of the three crude oils used in this example.

*Table I*

| South Oklahoma Crudes | Apparent Viscosity (cp.) | Plastic Viscosity (cp.) | Yield Point (lb./1,000 sq. ft.) | API Gravity | Fluid Loss (ml.) |
|---|---|---|---|---|---|
| No. 1 | 4.5 | 3 | 1 | 41 | 285 (in 45 sec.) |
| No. 2 | 8 | 8 | 0 | 56 | 122 (in 30 min.) |
| No. 3 | 24 | 23 | 2 | 34 | 248 (in 30 min.) |

Table II sets forth the results of the fluid-loss determinations of this example. The data in Table II show that the sulfonated asphalt additive of the subject invention imparts superior fluid-loss properties to the fracturing fluids treated therewith.

*Table II*

| Crude Oil | Additive | Conc. of Additive lb./bbl. | Thirty Minute Fluid Loss, ml. | |
|---|---|---|---|---|
| | | | API [1] | 387 [2] |
| No. 1 | Sulfonated Asphalt | 2.1 | 3.3 | 73 |
| No. 1 | do | 4.2 | 1.2 | [3] 20 |
| No. 1 | FL-2 | 2.1 | 5.0 | 120 |
| No. 1 | FL-2 | 4.2 | 4.5 | 26 |
| No. 1 | FL-3 | 2.1 | 14.2 | [3] 108 |
| No. 1 | FL-3 | 4.2 | >45 | 66 |
| No. 1 | Adomite | 2.1 | 27.4 | 110 |
| No. 1 | do | 4.2 | 27 | 43 |
| No. 2 | Sulfonated Asphalt | 2.1 | 1.3 | 22 |
| No. 2 | do | 4.2 | 0.6 | [3] 5.9 |
| No. 2 | FL-2 | 2.1 | 4.2 | 18 |
| No. 2 | FL-2 | 4.2 | 3.0 | 5.6 |
| No. 2 | FL-3 | 2.1 | 6.0 | 100 |
| No. 2 | FL-3 | 4.2 | 3.3 | 119 |
| No. 2 | Adomite | 2.1 | 2.4 | 36 |
| No. 2 | do | 4.2 | 1.0 | 38 |
| No. 3 | Sulfonated Asphalt | 2.1 | 0.6 | 4.0 |
| No. 3 | do | 4.2 | 0.0 | 2.0 |
| No. 3 | FL-2 | 2.1 | 4.8 | 21 |
| No. 3 | FL-2 | 4.2 | 2.5 | 9.6 |
| No. 3 | FL-3 | 2.1 | 1.5 | |
| No. 3 | FL-3 | 4.2 | 1.6 | 211 |
| No. 3 | Adomite | 2.1 | 3.2 | 56 |
| No. 3 | do | 4.2 | 1.2 | 43 |

[1] Fluid loss at room temperature and 100 p.s.i.
[2] Fluid loss at 125° F. and 1,000 p.s.i.
[3] Average of two determinations.

Various modifications and alterations of this invention will become apparent to those skilled in the art without departing from the scope and spirit of this invention, and it should be understood that the invention is not to be unduly limited to that set forth here for illustrative purposes.

I claim:

1. A method of treating a formation penetrated by a well, which comprises injecting into said well a formation breakdown fluid under sufficient pressure to fracture said formation, and injecting into the fractured formation a composition comprising a liquid carrier containing sulfonated asphalt added thereto and in an amount sufficient to reduce the fluid loss of said composition.

2. A method of fracturing a low permeable formation penetrated by a well, which comprises injecting into said well a formation breakdown fluid under sufficient pressure to fracture said formation, injecting into the resulting fractured formation a composition comprising a petroleum oil and sulfonated asphalt added thereto and dispersed therein in an amount sufficient to reduce the fluid loss of said composition, and thereafter producing said well to remove said liquid.

3. A method of fracturing a low permeable formation penetrated by a well, which comprises injecting into said well a formation breakdown fluid under sufficient pressure to fracture said formation, injecting into the resulting fractured formation a composition comprising a petroleum oil and sulfonated asphalt added thereto and dispersed therein in an amount sufficient to reduce the fluid loss of said composition, and thereafter producing said well to remove said composition, said sulfonated asphalt being selected from the group consisting of the ammonium, alkali metal, and alkaline earth metal salts of a sulfonated asphalt.

4. The method according to claim 3 wherein said sulfonated asphalt is an ammonium salt.

5. The method according to claim 3 wherein said sulfonated asphalt is an alkaline earth metal salt.

6. The method according to claim 3 wherein said sulfonated asphalt is an alkali metal salt.

7. The method according to claim 3 wherein said sulfonated asphalt is a sodium salt.

8. The method according to claim 3 wherein the amount of said sulfonated asphalt in said composition is in the range between about 0.1 and 30 pounds per barrel of said composition.

9. The method according to claim 3 wherein the amount of said sulfonated asphalt in said composition is in the range between about 0.1 and 10 pounds per barrel of said composition.

10. The method according to claim 3 wherein said sulfonated asphalt is prepared by dispersing asphaltic material in a normally liquid, inert, low-boiling paraffinic hydrocarbon, the resulting dispersion is contacted with liquid sulfur trioxide, the resulting sulfonation mixture is neutralized with a basic neutralizing agent, and the resulting sulfonated asphalt product recovered from the resulting neutralized mixture.

11. The method according to claim 10 wherein said asphaltic material is a vis-broken, vacuum reduced asphalt.

12. The method according to claim 10 wherein said basic neutralizing agent is selected from the group consisting of ammonia and alkali metal and alkaline earth metal salts, oxides, and hydroxides.

13. A method of fracturing a low permeable formation penetrated by a well, which comprises injecting into said well a formation breakdown fluid under sufficient pressure to fracture said formation, injecting into the resulting fractured formation a composition comprising a petroleum oil and sulfonated asphalt added thereto and dispersed therein in an amount sufficient to reduce the fluid loss of said composition, and thereafter producing said well to remove said composition, wherein said sulfonated asphalt is prepared by dispersing a vis-broken, vacuum reduced asphalt in a normally liquid, inert, low-boiling paraffinic hydrocarbon having a total of from 5 to 8 carbon atoms per molecule, the resulting dispersion is contacted with liquid sulfur trioxide, the resulting sulfonation mixture is neutralized with aqueous sodium hydroxide, the paraffinic hydrocarbon is removed from the resulting neutralized mixture, and the resulting sodium salt of sulfonated asphalt is recovered for use in fracturing said well.

References Cited in the file of this patent

UNITED STATES PATENTS

| | | |
|---|---|---|
| 2,667,224 | Howard | Jan. 26, 1954 |
| 2,748,057 | Goren | May 29, 1956 |
| 2,779,735 | Brown et al. | Jan. 29, 1957 |
| 2,793,996 | Lummus | May 28, 1957 |
| 2,811,207 | Clark | Oct. 29, 1957 |
| 2,885,336 | Goren | May 5, 1959 |
| 2,946,746 | Keller | July 26, 1960 |
| 2,950,247 | McGuire et al. | Aug. 23, 1960 |
| 2,982,724 | Gibson et al. | May 2, 1961 |
| 2,988,505 | Oakes | June 13, 1961 |

FOREIGN PATENTS

| | | |
|---|---|---|
| 579,196 | Canada | July 7, 1959 |

OTHER REFERENCES

Sperling: Sulfonation Products of Mineral Oil, article in Ind. and Eng. Chem., vol. 40, May 1948, pages 890 to 896.